UNITED STATES PATENT OFFICE.

EDWARD JANITZKY, OF PYMBLE, NEAR SYDNEY, NEW SOUTH WALES, AUSTRALIA.

PROCESS OF PRESERVING.

No. 876,806.      Specification of Letters Patent.      Patented Jan. 14, 1908.

Application filed May 28, 1906. Serial No. 319,141.

*To all whom it may concern:*

Be it known that I, EDWARD JANITZKY, a subject of the King of Great Britain, residing at Pymble, near Sydney, in the State of New South Wales, Commonwealth of Australia, have invented certain new and useful Improvements in Processes of Preserving, of which the following is a specification.

This invention relates to an improved process for the preservation of animal substances such as beef, mutton, game, fish, sausages, and the like, whereby they are maintained in good condition for lengthened periods.

Heretofore oxygen gas has been used in the preservation of animal substances but in some cases it was employed for the purpose of sterilizing the articles which were then sealed up in air-tight tins. In other instances the oxygen was produced or given off from chemicals which were mixed with the animal substances, in which cases there was the danger of noxious chemicals being left in the substances, or of water in excess being produced.

According to this invention the substances to be preserved are subjected in a closed chamber to the action of hot oxygen gas under a pressure depending on the size, or nature of the substance under treatment.

I have found that a pressure of from about 1 to 40 lbs. or more maintained from half an hour to six hours is sufficient for practical purposes to enable the hot gas to thoroughly penetrate the material.

Although it is not essential it is desirable that the gas should be applied to the substances when the latter are in an aseptic condition, or preferably immediately the animal, has been killed, and when they have been placed in the chamber the air is pumped or withdrawn therefrom before the hot gas is applied. The action of the hot oxygen, which is at a temperature of about 60° to 90° C., is that in addition to insuring complete sterilization of the substances under treatment it coagulates the albumen contained therein which forms a thin coating or film around the portions liable to decomposition.

The oxygen gas may be generated and heated in any known way and if necessary it may be made to pass through heated pipes before entering the chamber to further heat it.

After animal substances have been treated by this process it is not necessary to inclose them in air-tight vessels but preferably they are kept at a temperature of about 15° C. in order to avoid loss of moisture.

Having now fully described and ascertained my invention and the manner in which it is to be performed I declare that what I claim is:—

A process of preserving animal substances in the form of meats consisting in placing the substance in an air-tight chamber, withdrawing the air therefrom, and then forcing in oxygen gas heated to a temperature of from 60 to 90 degrees C. and under a pressure of from 1 to 40 pounds.

In testimony whereof I have hereunto set my hand in presence of two subscribing witnesses.

EDWARD JANITZKY.

Witnesses:
     CHARLES EDWARD GRAHAM,
     HENRY WATCHORNE CLARKE.